(12) United States Patent
Zhu et al.

(10) Patent No.: US 11,403,004 B2
(45) Date of Patent: Aug. 2, 2022

(54) DATA MANAGEMENT METHOD AND APPARATUS, AND SERVER

(71) Applicant: Huawei Technologies Co., Ltd., Shenzhen (CN)

(72) Inventors: Zheng Zhu, Hangzhou (CN); Zhichang Lv, Hangzhou (CN); Xinghui Tian, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/213,841

(22) Filed: Mar. 26, 2021

(65) Prior Publication Data
US 2021/0216222 A1   Jul. 15, 2021

Related U.S. Application Data

(63) Continuation of application No. PCT/CN2019/093962, filed on Jun. 29, 2019.

(30) Foreign Application Priority Data

Sep. 28, 2018 (CN) .......................... 201811140158.3

(51) Int. Cl.
*G06F 3/06* (2006.01)

(52) U.S. Cl.
CPC .......... *G06F 3/0622* (2013.01); *G06F 3/0605* (2013.01); *G06F 3/067* (2013.01);
(Continued)

(58) Field of Classification Search
CPC .... G06F 3/0605; G06F 3/0622; G06F 3/0631; G06F 3/0637; G06F 3/0638; G06F 3/0662; G06F 3/0664; G06F 3/067; G06F 3/0683
(Continued)

(56) References Cited

U.S. PATENT DOCUMENTS

2010/0058036 A1* 3/2010 Degenaro ............. G06F 9/5027
  712/220
2019/0266006 A1* 8/2019 Cao ........................ G06F 8/71

FOREIGN PATENT DOCUMENTS

CN   103107889 A   5/2013
CN   103246850 A   8/2013
(Continued)

OTHER PUBLICATIONS

Turan et al., "Trust in FPGA-accelerated Cloud Computing", ACM Computing Surveys, vol. 53, Article 128, Dec. 2020. (Year: 2020).*
(Continued)

*Primary Examiner* — Gary J Portka
(74) *Attorney, Agent, or Firm* — Conley Rose, P.C.

(57) ABSTRACT

A data management method includes receiving, by a management server, a first request, determining, based on an identifier of a first user in the first request, whether a shadow tenant bucket associated with the identifier of the first user exists, and if the shadow tenant bucket associated with the identifier of the first user exists, storing, in the shadow tenant bucket associated with the identifier of the first user, an acceleration engine image (AEI) that the first user requests to register, where a shadow tenant bucket is used to store an AEI of a specified user, and each shadow tenant bucket is in a one-to-one correspondence with a user.

20 Claims, 9 Drawing Sheets

(52) U.S. Cl.
CPC .......... *G06F 3/0631* (2013.01); *G06F 3/0637* (2013.01); *G06F 3/0638* (2013.01); *G06F 3/0662* (2013.01)

(58) Field of Classification Search
USPC ............. 711/152, 163, 209; 726/4, 5, 27, 28
See application file for complete search history.

(56) References Cited

FOREIGN PATENT DOCUMENTS

| | | |
|---|---|---|
| WO | 03040945 A1 | 5/2003 |
| WO | 33040945 A1 | 5/2003 |

OTHER PUBLICATIONS

Giechaskiel et al., "Cross-VM Information Leaks in FPGA-Accelerated Cloud Environments", IEEE, 2021. (Year: 2021).*

Zhu et al., "FPGA Resource Pooling in Cloud Computing", IEEE, Oct. 4, 2018. (Year: 2018).*

Chen, et al., "Enabling FPGAs in the Cloud," Computing Frontiers, ACM, 2 Penn Plaza,Suite 701 New York NY, May 20-22, 2014, 10 pages.

Stamelos, I., et al., "A novel framework for the Seamless integration of FPGA accelerators with Big Data analytics Frameworks in Heterogeneous data centers," International Conference on High Performance Computing and Simulation, 2018, 7 pages.

\* cited by examiner

DATA MANAGEMENT METHOD AND APPARATUS, AND SERVER

CROSS-REFERENCE TO RELATED APPLICATIONS

This application is a continuation of International Patent Application No. PCT/CN2019/093962 filed on Jun. 29, 2019, which claims priority to Chinese Patent Application No. 201811140158.3 filed on Sep. 28, 2018. The disclosures of the aforementioned applications are hereby incorporated by reference in their entireties.

TECHNICAL FIELD

This application relates to the field of cloud computing technologies, and in particular, to a data management method and apparatus, and a server.

BACKGROUND

A field programmable gate array (FPGA) accelerated cloud server is an FPGA-based elastic cloud server. The FPGA accelerated cloud server can be used to provide a tool and an environment for a user to easily develop and deploy an FPGA-based acceleration service, and provide the user with an FPGA cloud service that is easy to use, cost effective, agile, and secure.

The FPGA accelerated cloud server may be used to develop, deploy, and use an intellectual property (IP) kernel module. The IP kernel module may be a pre-designed, unverified or verified integrated circuit, device, or component that has a determined function. After developing the IP kernel module, the user can store an acceleration engine image (AEI) associated with the IP kernel module to a cloud server. The user and another user who obtains permission to use the IP kernel module can load and use the AEI associated with the IP kernel module to implement a function of the IP kernel module.

However, currently, the AEI associated with the IP kernel module developed by the user is uniformly stored and managed, and this has security risks.

SUMMARY

This application provides a data management method and apparatus, and a server, to resolve a technical problem that there are security risks in current uniform storage and management of an AEI of a user.

According to a first aspect, a data management method is provided. After a first request is received, it is determined, based on an identifier of a first user in the first request, whether a shadow tenant bucket associated with the identifier of the first user exists, and if the shadow tenant bucket associated with the identifier of the first user exists, an AEI that the first user requests to register is stored in the shadow tenant bucket associated with the identifier of the first user, where the first request is used to request to register the AEI customized by the first user, the shadow tenant bucket is used to store the AEI of the first user, and each shadow tenant bucket is in a one-to-one correspondence with a user.

According to the foregoing manner, the AEI requested by the first user for the registration may be stored in the shadow tenant bucket. Because the shadow tenant bucket stores an AEI of a specified user, security of storage of the AEI can be improved.

In a possible implementation, when it is determined whether the shadow tenant bucket associated with the identifier of the first user in the first request exists, an identifier of the shadow tenant bucket associated with the identifier of the first user may be determined according to a first rule, where the first rule is used to indicate a generation rule of the identifier of the shadow tenant bucket. After the identifier of the shadow tenant bucket is determined, whether a shadow tenant bucket having the identifier exists in all currently created shadow tenant buckets may be queried. If the shadow tenant bucket having the identifier exists, the shadow tenant bucket is the shadow tenant bucket associated with the identifier of the first user. Therefore, the existing shadow tenant bucket associated with the identifier of the first user may be queried based on the identifier of the first user in the first request.

In a possible implementation, if it is determined that the shadow tenant bucket associated with the identifier of the first user does not exist, storage space with a preset size may be selected as the shadow tenant bucket associated with the identifier of the first user. Then, the AEI registered by the first user may be stored in the newly created shadow tenant bucket. Therefore, when no shadow tenant bucket associated with the identifier of the first user exists in all currently created shadow tenant buckets, the shadow tenant bucket associated with the identifier of the first user is created, and the AEI registered by the first user is stored in the shadow tenant bucket.

In a possible implementation, if a second request is received, it may be determined, based on an identifier of a second user and the identifier of the AEI that are included in the second request, that the permission verification of the second user succeeds. Then, the AEI is loaded to an FPGA card based on information about the FPGA card in the second request, where the FPGA card is an FPGA card associated with a first virtual machine associated with the second user. In this way, the AEI may be loaded, based on the second request, to the FPGA card associated with the first virtual machine associated with the second user. Therefore, the second user may use the AEI in the FPGA card through the first virtual machine.

In a possible implementation, if the identifier of the second user carried in the second request includes an identifier of the first virtual machine, when it is determined whether the permission verification of the second user succeeds, an identifier of an image corresponding to the identifier of the first virtual machine may be determined according to a first correspondence, and an identifier of at least one AEI corresponding to the identifier of the image is determined according to a second correspondence. If the identifier of the AEI included in the second request is included in the determined identifier of the at least one AEI, it may be determined that the permission verification of the second user succeeds, and otherwise, it may be determined that the permission verification of the second user fails. The first correspondence may indicate a correspondence between an identifier of a virtual machine and an identifier of an image allowed to be used by the virtual machine, and the second correspondence may indicate a correspondence between an identifier of an image and an identifier of an AEI. Therefore, the permission verification may be performed on the second user based on the identifier of the second user and the identifier of the AEI.

In a possible implementation, if a third request is received, in response to the third request, a resource occupied by a second virtual machine may be released, and an AEI in an FPGA card associated with the second virtual machine may be asynchronously cleared. The third request is used by a third user to request to delete the second virtual machine, where the second virtual machine is a virtual machine associated with the third user. In this way, the resource release step and the FPGA card clearing step that are in the process of deleting the virtual machine can be decoupled. This avoids a virtual machine resource release failure caused by a fault of a program in an FPGA card clearing program.

In a possible implementation, when the AEI in the FPGA card associated with the second virtual machine is cleared, the FPGA card may be set to a to-be-cleared status, and an AEI clearing interface of the FPGA card is invoked to clear the AEI. After that, whether the AEI in the FPGA card is successfully cleared may be determined at preset duration. If the AEI in the FPGA card is successfully cleared, set the FPGA card to an available status, and otherwise, it is determined that the FPGA card is not successfully cleared. If a quantity of times that the FPGA card is not successfully cleared reaches a threshold, an alarm is generated. Therefore, a manner of clearing the AEI in the FPGA card is provided, and a state of the FPGA card that is not successfully cleared is set to the to-be-cleared status, to avoid leakage of the AEI that has not been cleared because the FPGA card is re-allocated to a virtual machine associated with another user. In addition, when the quantity of times that the FPGA card is not successfully cleared reaches the preset threshold, the alarm may be further generated to prevent the FPGA card from being in the to-be-cleared status for a long time.

According to a second aspect, this application provides a data management apparatus. The apparatus includes modules configured to perform the troubleshooting method in any one of the first aspect or the possible implementations of the first aspect. According to a third aspect, this application provides a server. The server includes a processor, a memory, a communications interface, and a bus. The processor, the memory, and the communications interface are connected to and communicate with each other through the bus. The memory is configured to store a computer-executable instruction. When the apparatus runs, the processor executes the computer-executable instruction in the memory to perform, by using hardware resources in the apparatus, the operation step of the method according to any one of the first aspect or the possible implementations of the first aspect.

According to a fourth aspect, this application provides an FPGA cloud computing system. The FPGA cloud computing system includes a service server and a management server. The management server may be configured to perform operation steps of the method in any one of the first aspect or the possible implementations of the first aspect.

According to a fifth aspect, this application provides a computer-readable storage medium. The computer-readable storage medium stores an instruction. When the instruction is run on a computer, the computer is enabled to perform the method in any one of the first aspect or the possible implementations of the first aspect.

According to a sixth aspect, this application provides a computer program product including an instruction. When the instruction is run on a computer, the computer is enabled to perform the method in any one of the first aspect or the possible implementations of the first aspect.

Based on the implementations provided in the foregoing aspects, this application may further combine the implementations to provide more implementations.

DESCRIPTION OF EMBODIMENTS

Figure 1:
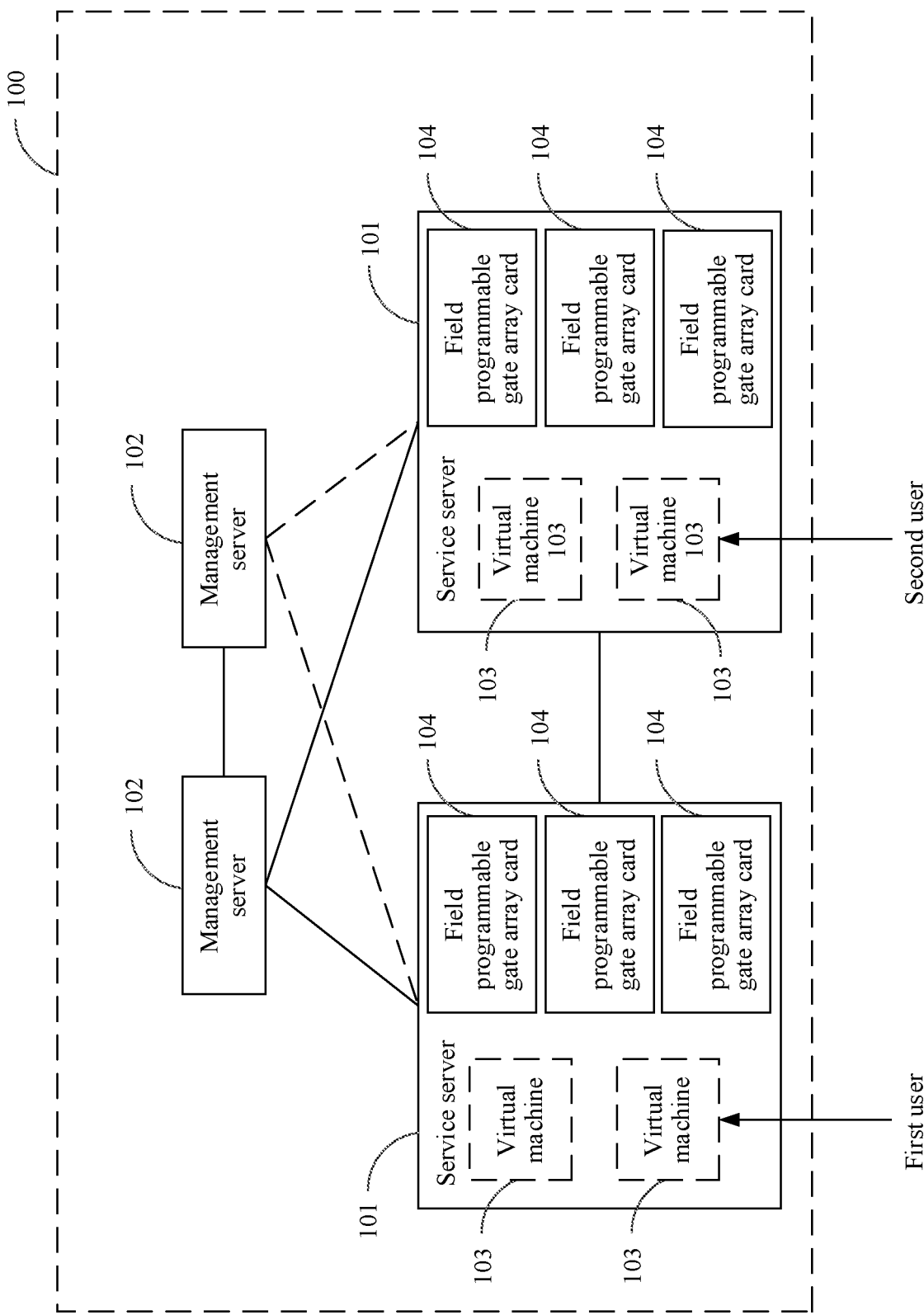
FIG. 1 is a schematic diagram of an architecture of an FPGA cloud computing system according to an embodiment of this application.

To make the objectives, technical solutions, and advantages of this application clearer, the following further describes this application in detail with reference to the accompanying drawings.

The following explains terms related in this application.

1. At least one means one or more, that is, including one, two, three, or more.

2. A plurality of means two or more, that is, including two, three, or more.

3. Loading may mean that a file is copied from A to B, so that both A and B have the file. Alternatively, a file may be cut from A to B, and after the cutting, only B has the file.

4. An identifier may be information that uniquely identifies an object, including a number, a name, description information, and the like. For example, an identifier of an AEI may include one or more of a number of the AEI, a name of the AEI, and description information of the AEI.

5. An FPGA accelerated cloud server is a virtual machine or a server that provides a tool and an environment for service development and implements an FPGA acceleration algorithm. The FPGA accelerated cloud server may be used to provide a hardware development kit (HDK) and a software development kit (SDK). The HDK may include necessary tools such as an accelerator example, a coding environment, a simulation platform, an automatic compilation tool, and a code encryption and debugging toolkit, and the SDK may include necessary tools such as an application example, a hardware abstract interface, an accelerator abstract interface, an accelerator driver and runtime, and a version management tool. A user can develop an application through the FPGA accelerated cloud server. A developed file may include an FPGA-related netlist, a compilation report, a time sequence report, and the like, for example, a design check point (DCP) file. The developed DCP file may be stored in a background storage bucket corresponding to the user.

6. A storage bucket, also referred to as a tenant bucket or a tenant storage bucket, is storage space of an FPGA accelerated cloud server associated with a user. The storage bucket is storage space that can be perceived and operated by a user. The user can access the storage space associated with the user through the cloud server. For example, the user can store a file in the storage space, and can also set the storage bucket associated with the user. For example, the user can allow or forbid another user to access the storage bucket associated with the user. The storage bucket can be used to store data and files. For example, the storage bucket can be used to store a DCP file developed by the user, and an AEI. The storage bucket related in the embodiments of this application may be an object storage service (OBS) storage bucket, or may be implemented by using another type of storage service. This is not limited in the embodiments of this application.

7. An AEI may be a file (for example, a DCP file) that is developed by a user through an FPGA accelerated cloud server or a lab environment, or a file (which may include data, logic, an algorithm, and the like) that is associated with an IP kernel module and that is obtained after the user performs compilation through the FPGA accelerated cloud server. A corresponding function of the IP kernel module can be implemented through loading and running of the AEI. The user may register a user-customized AEI through the FPGA accelerated cloud server, where the user-customized AEI may include a user-customized algorithm and/or logic. An existing cloud service function or a new user-customized cloud service function may be implemented through implementation of the AEI.

8. A shadow tenant bucket, also referred to as a shadow bucket or a shadow storage bucket, is storage space that is associated with a user and that is in an FPGA accelerated cloud server. The FPGA accelerated cloud server may store data and files of the user in the shadow tenant bucket associated with the user. However, the user cannot perceive that the data and the files are stored in the shadow tenant bucket. When the shadow tenant bucket is created, the shadow tenant bucket may be bound to an identifier and/or authentication information of the user, to associate the user with the shadow tenant bucket. A difference between the shadow tenant bucket and a storage bucket is that the user cannot perceive existence of the shadow tenant bucket. The cloud server automatically stores data that meets a condition in the shadow tenant bucket. When the user invokes data, the cloud server automatically identifies whether the data is stored in the shadow tenant bucket. When the data is stored in the shadow tenant bucket, the cloud server automatically invokes the data in the shadow tenant bucket. This process cannot be perceived by the user. However, the storage bucket is storage space that can be perceived by the user. The user can control the cloud server to store data in the storage bucket, and control the cloud server to invoke the data in the storage bucket.

9. An FPGA card, also referred to as an FPGA acceleration card or an FPGA data acceleration card, can implement complex logic and algorithm processing through an FPGA. The FPGA card is used in common acceleration application scenarios such as algorithm acceleration, big data analysis, high-performance computing, and server hardware acceleration. An algorithm of the FPGA acceleration card may be modified based on an actual requirement of a user. For example, an AEI may be loaded to the FPGA card through a server and a virtual machine that are associated with the FPGA card, so that an algorithm included in the AEI is loaded to the FPGA card. The AEI loaded in the FPGA card is modified or deleted through the server and the virtual machine, to modify or delete an acceleration algorithm of the FPGA card.

10. An FPGA virtual machine may be a virtual machine that is in an FPGA cloud computing system and that is associated with at least one FPGA card. The FPGA virtual machine may be configured to execute an algorithm loaded in the FPGA card, to implement a corresponding function of the algorithm. The FPGA virtual machine may be associated with a user. For example, the FPGA cloud computing system may create an FPGA virtual machine for the user according to a request of the user, and configure the FPGA virtual machine and an FPGA card associated with the FPGA virtual machine based on permission, a requirement, and the like of the user.

11. Authentication information is information used for user authentication. The authentication means that when a user accesses an FPGA cloud server or uses an AEI service (for example, creation of an AEI, running of an AEI, or deletion of an AEI), permission of the user is authenticated based on the authentication information of the user. Only an authenticated user can access the FPGA cloud server or use the AEI service, to prevent a user who does not have an authentic identity or whose authentication information is inauthentic and invalid from accessing the FPGA cloud server or using the AEI service. This improves security of the FPGA cloud server. The authentication information of the user includes but is not limited to an access key identifier (AK) and a secret access key (SK) of the user. The authentication herein may be identity and access management (IAM) authentication.

The following describes the embodiments of this application in detail with reference to the accompanying drawings. First, a cloud computing system provided in an embodiment of this application is described, and a data management method provided in this application may be applied to the system. Then, a data management apparatus provided in an embodiment of this application is described. Finally, the data management method provided in an embodiment of this application is described.

As shown in FIG. 1, the FPGA cloud computing system 100 provided in an embodiment of this application may be a virtualized environment including a plurality of servers. The FPGA cloud computing system 100 may include a plurality of management servers 102 and a plurality of service servers 101. The plurality of management servers 102 may interact with each other through a communications interface, and the plurality of service servers 101 may also interact with each other through a communications interface.

Each service server 101 may be connected to one or more FPGA cards 104, and one or more virtual machines 103 may run on each service server 101. The virtual machine 103 herein may be an FPGA virtual machine or a standard virtual machine, and each FPGA virtual machine may be associated with the one or more FPGA cards. The FPGA virtual machine may be configured to execute an acceleration algorithm loaded in an FPGA card associated with the FPGA virtual machine (for example, an AEI loaded in the FPGA card is invoked, to implement an AEI-related function), and the standard virtual machine is a virtual machine that is not associated with an FPGA card.

The FPGA cloud computing system 100 may create, for a user, one or more standard virtual machines or FPGA virtual machines associated with the user. For example, as shown in FIG. 1, the virtual machine 103 runs in the service server 101, and the user may access the FPGA cloud computing system 100 through the standard virtual machine or the FPGA virtual machine. Specifically, it is assumed that the virtual machine 103 associated with a first user is the FPGA virtual machine, and the first user may invoke, through the virtual machine 103, an AEI loaded by instruction code in an FPGA card associated with the virtual machine 103, to run the AEI.

The management server 102 may be configured to manage the FPGA cloud computing system 100, including but not limited to compiling and generating an AEI, creating, modifying, or deleting the virtual machine 103 (the FPGA virtual machine or the standard virtual machine), and loading or deleting the AEI in the FPGA card associated with the FPGA virtual machine. The management server 102 may provide at least one cloud service through software, hardware, or a combination of software and hardware. For example, the management server 102 may be configured to provide an FPGA image service and an AEI management service, and is configured to manage the AEI. For example, the FPGA image service may obtain a DCP file uploaded by the user, and is configured to store the AEI file, and obtain and query AEI-related information. The AEI management service can be used to compile and generate the AEI file based on the DCP file. During implementation, the plurality of management servers 102 may jointly manage one or more service servers 101. The plurality of management servers may use an active/standby working mode. Specifically, one management server 102 is a management server in an active status, and one or more other management servers 102 are management servers in a standby status (interaction between the standby management server and the service server 101 is indicated by a dashed line in FIG. 1). At a same time point, only the management server in the active status is used to manage the service server. When the management server in the active status is faulty, a plurality of management servers in the standby status may reselect a new management server in the active status, and the new management server in the active status takes over the management task of the service server. Optionally, the plurality of management servers may also use another working mode. For example, the plurality of management servers use a load sharing working mode, and the management servers jointly manage the plurality of service servers. A working mode of the plurality of management servers is not limited in this embodiment of this application. For ease of description, an example in which the plurality of management servers are in the active/standby working mode is used for description in the following description of an embodiment of this application.

It should be understood that an architecture shown in FIG. 1 shows only a possible hardware structure of the FPGA cloud computing system 100. In addition to the structure shown in the figure, a necessary component may be further included. For example, the FPGA cloud computing system 100 may further include a storage device, configured to store data, where the storage device may include a storage node device or a storage node device cluster. In addition, it should also be understood that the architecture shown in FIG. 1 is merely an example, and the data management system provided in this application is not limited thereto. To be specific, each service server in the data management system may run one virtual machine, or may run the plurality of virtual machines. Each virtual machine may be associated with one FPGA card, or may be associated with the plurality of FPGA cards.

Figure 2:
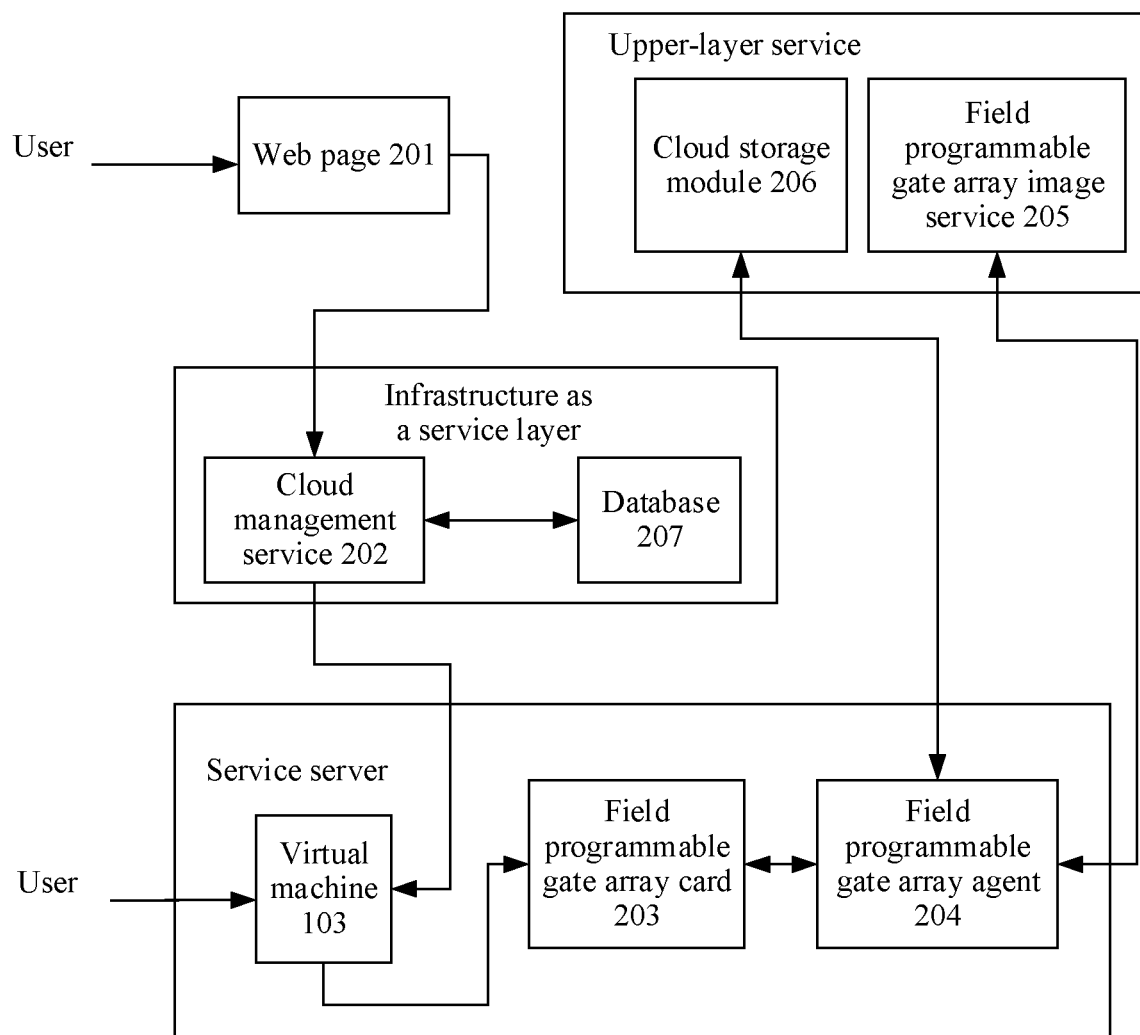
FIG. 2 is a schematic diagram of an architecture of another FPGA cloud computing system according to an embodiment of this application.

FIG. 2 is a schematic diagram of a logical architecture of an FPGA cloud computing system 100 according to an embodiment of this application. As shown in the figure, a management server 102 and/or a service server 101 provide a web page 201, a cloud management service 202, an FPGA agent 204, an FPGA image service 205, a cloud storage module 206, and a database 207 that are shown in FIG. 2.

Based on the architecture shown in FIG. 2, a user may request to create an FPGA virtual machine through the web page 201, or the user may access the FPGA cloud computing system 100 through a created FPGA virtual machine. A function of the web page 201 may be implemented through software of the FPGA cloud computing system 100. Specifically, the user sends, through the web page 201, a request for creating the FPGA virtual machine to the cloud management service 202 in the FPGA cloud computing system 100. The cloud management service 202 may control, based on the request, the service server to create a virtual machine 103, where the virtual machine 103 is associated with an FPGA card 203. The cloud management service 202 herein may be implemented through an infrastructure as a service (IaaS) layer. The IaaS layer provides a storage resource (for example, the database 207) and a hardware device for the user, so that the user uses the storage resource and the hardware device to access the FPGA cloud computing system 100. The cloud management service 202 herein is specifically virtualization management software, for example, FUSIONSPHERE. The FPGA card 203 may implement message transfer through a preset module. For example, in a process of loading an AEI through a mailbox, the FPGA card 203 receives a request that is for loading the AEI and that is sent by the user through the virtual machine 103, and sends the request, to the FPGA agent 204 through the mailbox, for requesting the FPGA agent 204 to load the AEI to the FPGA card 203. The FPGA agent 204 may query, from the FPGA image service 205 based on the loading request sent by the FPGA card 203, storage information (for example, a storage address) of the AEI that needs to be loaded. After obtaining the storage information of the AEI from the FPGA image service 205, the FPGA agent 204 may download the AEI from the cloud storage module 206 based on the storage information of the AEI. The cloud storage module 206 is a data storage module of the FPGA cloud computing system 100, and is configured to store a DCP and/or the AEI uploaded by the user. The FPGA card 203 may further include a dynamic loading module (iCAP), configured to load the obtained AEI to the FPGA card 203.

For example, a function of the service server shown in FIG. 2 may be implemented by the service server 101 shown in FIG. 1, a function of the FPGA card 203 may be implemented by the FPGA card 104 connected to the service server 101 shown in FIG. 1, and the FPGA agent 204 may be implemented by the service server 101 through software. Functions of the web page 201, the cloud management service 202, the database 207, the FPGA image service 205, and the cloud storage module 206 may be implemented by the management server 102 shown in FIG. 1 through software.

Figure 3:
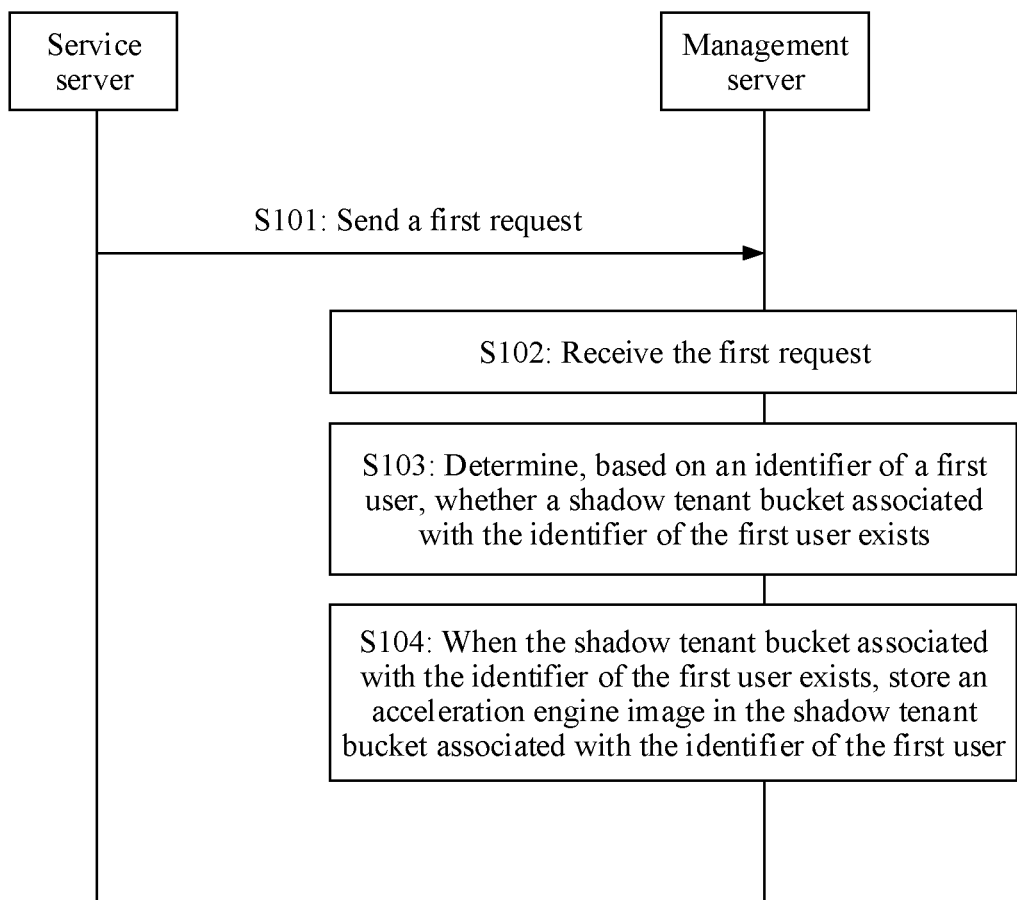
FIG. 3 is a schematic flowchart of a method for registering an AEI according to an embodiment of this application.

With reference to the FPGA cloud computing system 100 shown in FIG. 1 and FIG. 2, the following further describes a data management method provided in an embodiment of this application. FIG. 3 is a schematic flowchart of a method for registering an AEI according to an embodiment of this application. The method may be implemented by the service server 101 and the management server 102 in FIG. 1. The method may include the following steps.

S101. A service server sends a first request, where the service server runs a virtual machine associated with a first user, the first request is used by the first user to request to register an AEI customized by the first user, and the first request includes an identifier of the first user and an identifier of the AEI.

S102. A management server receives the first request.

S103. The management server determines, based on the identifier of the first user, whether a shadow tenant bucket associated with the identifier of the first user exists, where the shadow tenant bucket is used to store AEIs of specified users, and the first user is any one of the specified users.

S104. When the shadow tenant bucket associated with the identifier of the first user exists, the management server stores the AEI in the shadow tenant bucket associated with the identifier of the first user.

According to the foregoing method, the management server may store the AEI in the shadow tenant bucket associated with the identifier of the first user after creating the AEI. Because the shadow tenant bucket is only used to store the AEI of the specified user, when storing the AEI that the first user requests to register, AEIs of a plurality of users are no longer uniformly stored. This improves security of the AEI.

In a possible implementation, each shadow tenant bucket is in a one-to-one correspondence with a user. To improve the security of the shadow tenant bucket, the shadow tenant bucket can be used to store only the customized AEI that the specified user requests to register. Specifically, the management server may create the shadow tenant bucket that is in a one-to-one correspondence with the first user, where the shadow tenant bucket may be associated with the identifier of the first user, and the shadow tenant bucket is used to store the AEI that the first user requests to register.

In another possible embodiment, a relationship between the user and the shadow tenant bucket may be a many-to-one relationship. Creation of a shadow tenant bucket corresponding to a plurality of specified users (including the first user) is not excluded in this application. The shadow tenant bucket may be associated with identifiers of the plurality of specified users, so that the shadow tenant bucket may be shared by the first user and another user of the specified users. Because the user cannot access the shadow tenant bucket or perform an operation on a file in the shadow tenant bucket, security of the shadow tenant bucket may not be affected when the plurality of specified users share the shadow tenant bucket. Based on a same reason, creation of a plurality of shadow tenant buckets corresponding to a plurality of specified users (including the first user) is not excluded in this application. The plurality of shadow tenant buckets may be associated with identifiers of the plurality of specified users. It should be understood that the association between the shadow tenant bucket and the identifier of the user herein may be reflected as an association relationship between an identifier of the shadow tenant bucket and the identifier of the user.

During implementation of the step S101, the first user may trigger, through a virtual machine 103, the service server to send the first request. The identifier of the first user that is included in the first request may be a number of the user (for example, an identifier obtained when the user registers to obtain permission to use an FPGA cloud computing system 100, such as a user name and a nickname), authentication information of the user, and an identifier of an area in which the user is located (for example, one unique area number is corresponding to East China), or an identifier of the virtual machine 103 associated with the first user. Because the first user is associated with the virtual machine 103, the identifier of the virtual machine 103 may be used as the identifier of the first user to identify the first user. It should be understood that, in specific implementation, one or more of the identifier of the user, the authentication information of the user, the identifier of the area in which the user is located, or the identifier of the virtual machine 103 associated with the first user may be used as the identifier of the first user.

In addition, the identifier of the AEI in the first request may be a number of the AEI, or may be a name and/or description information of the AEI input by the first user. For example, the first user may input, through selection or typing, one or more of the number, the name, or the description information of the AEI as the identifier of the AEI. After obtaining the identifier of the AEI, the service server 101 generates the first request including the identifier of the AEI.

The AEI that is customized by the first user and that is designed in the step S101 is an AEI that is generated through compilation based on a developed file (for example, a DCP file) uploaded by the first user to the tenant bucket and that includes logic and an algorithm customized by the first user. The AEI may implement, through the logic and the algorithm customized by the first user, an existing function or a function newly designed by the first user. The first user may upload, through the service server 101, a file used to register the AEI to the tenant bucket associated with the first user. The file herein may be the DCP file that is customized by the first user and that is used to generate the customized AEI.

During implementation of the step S103, the management server 102 may determine, according to a first rule, the identifier of the shadow tenant bucket associated with the identifier of the first user, and determine whether a shadow tenant bucket having the identifier exists. If yes, it is determined that the shadow tenant bucket having the identifier is the shadow tenant bucket associated with the identifier of the first user. The first rule may be a generation rule used when the identifier of the shadow tenant bucket is generated based on the identifier of the user, and the first rule may be preconfigured in the management server 102. During implementation, the management server 102 may store identifiers of shadow tenant buckets that have been created. The identifiers of the shadow tenant buckets are generated based on identifiers of users associated with the shadow tenant buckets and according to the first rule. After the identifier of the shadow tenant bucket associated with the identifier of the first user is determined according to the first rule, the management server 102 may query the identifiers of the shadow tenant buckets that have been created, to determine whether the identifier that is of the shadow tenant bucket associated with the identifier of the first user and that is determined according to the first rule is included.

Specifically, the identifier of the first user carried in the first request may include the identifier of the first user and the identifier of the area in which the first user is located. The first rule may be using a character string as the identifier of the shadow tenant bucket, where the character string is obtained by combining the identifier of the first user and the identifier of the area in which the first user is located, which are in the identifier of the first user, with a random number with a specified length.

If the management server 102 determines that the shadow tenant bucket associated with the identifier of the first user does not exist, the management server 102 may create the shadow tenant bucket associated with the identifier of the first user, and store the AEI in the shadow tenant bucket associated with the identifier of the first user.

Specifically, if the management server 102 determines that the identifier of the shadow tenant bucket that has been created does not include the identifier that is of the shadow tenant bucket associated with the identifier of the first user and that is determined according to the first rule, the management server 102 may select storage space with a preset size, use the storage space as the shadow tenant bucket associated with the identifier of the first user, and store the AEI in the shadow tenant bucket, to implement the creation of the shadow tenant bucket and the storage of the AEI.

In a possible embodiment, if the identifier of the first user includes the authentication information of the first user, the management server 102 may encrypt and store the AEI in the shadow tenant bucket based on the authentication information of the first user, to further improve the security during the storage of the AEI. The authentication information of the first user may be an AK and an SK of the first user, or another authentication information. Specifically, a key pair may be generated based on the authentication information of the first user in a data storage process. The key pair is used to encipher the AEI to generate a ciphertext, and store the ciphertext. When the AEI is obtained, the ciphertext is decrypted based on the key pair, to obtain a plaintext, namely, the AEI.

Figure 4A:
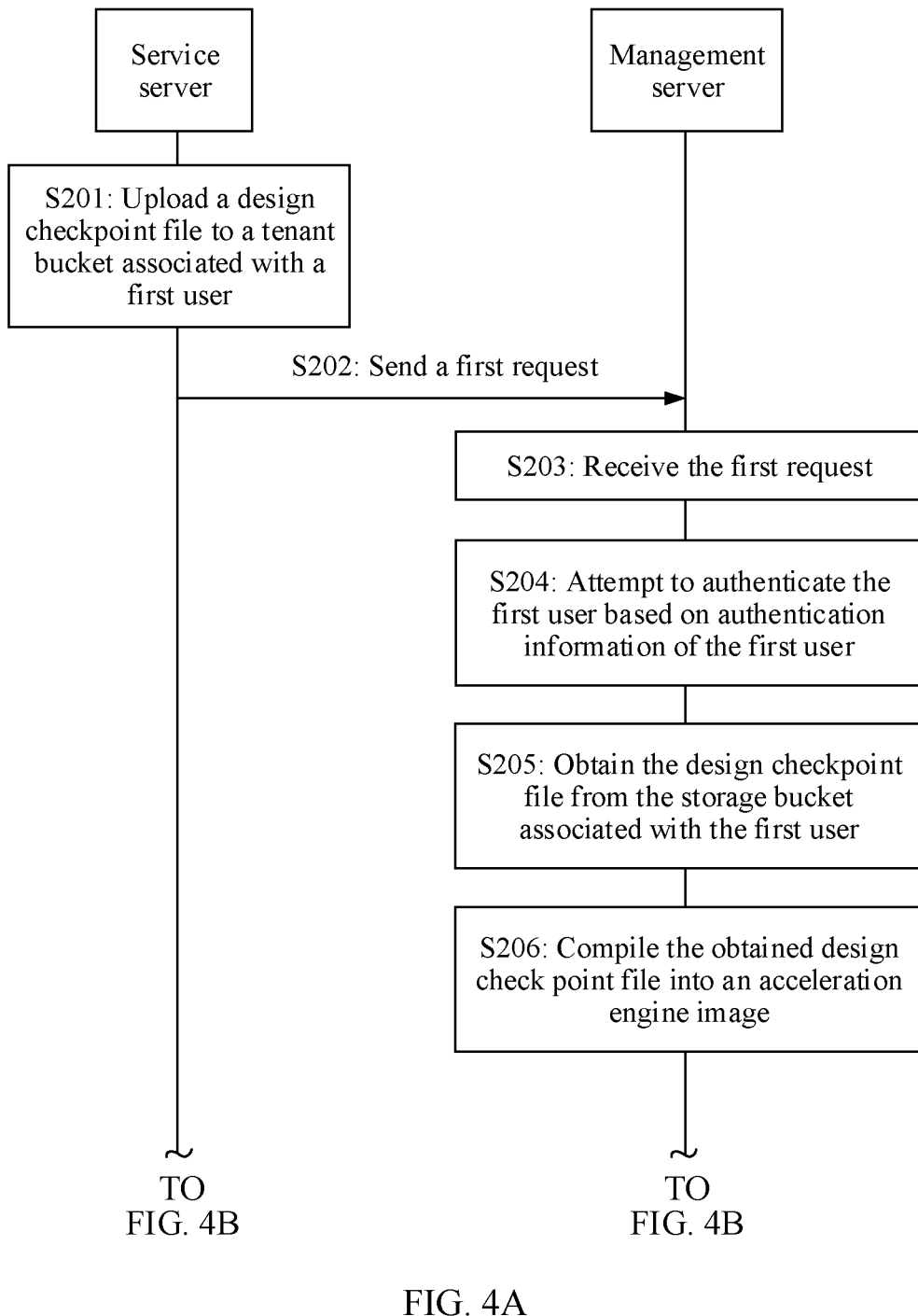
FIG. 4A and FIG. 4B are a schematic flowchart of a data management method according to an embodiment of this application.
Figure 4B:
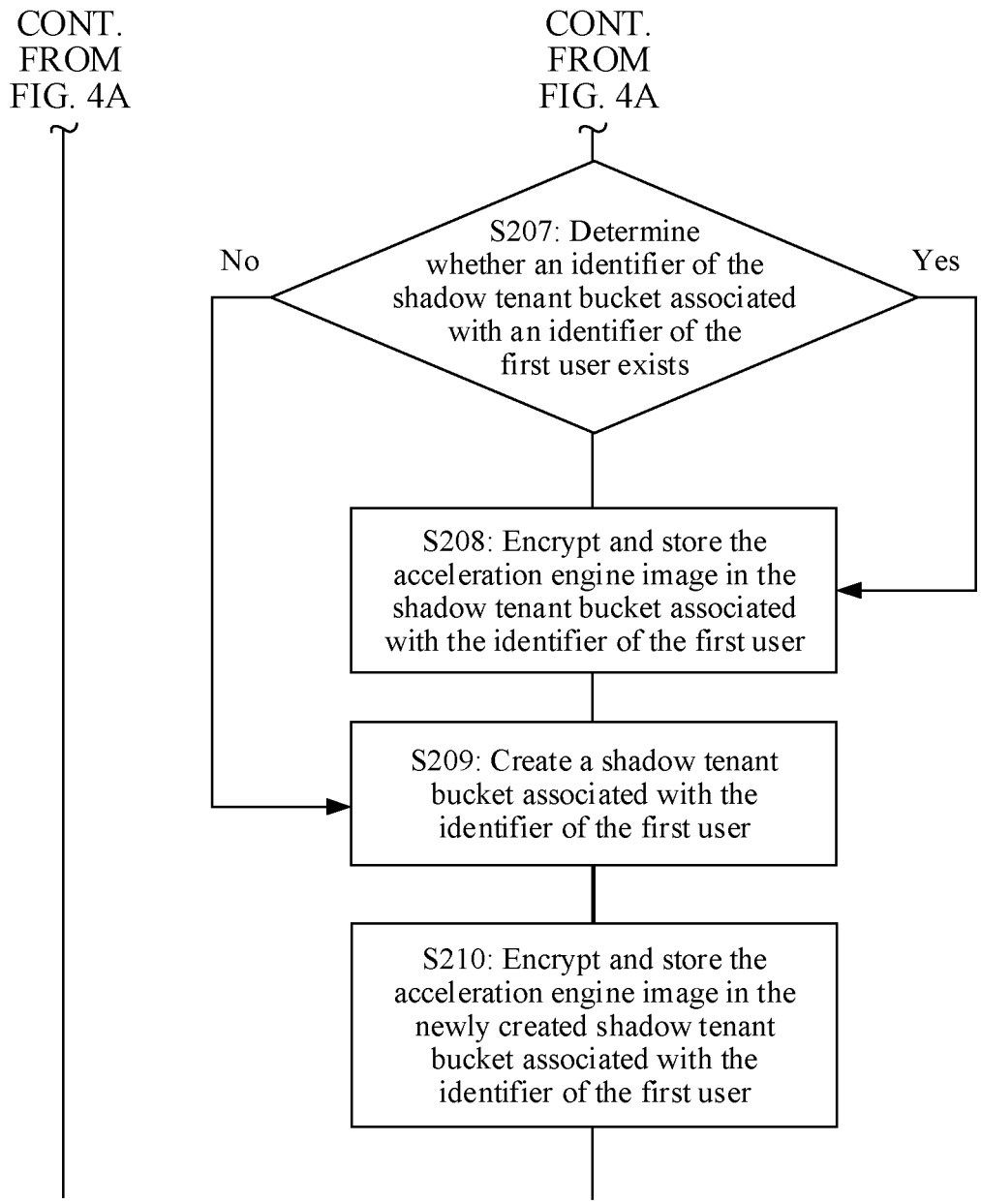

The following further describes a schematic flowchart of a data management method according to an embodiment of this application with reference to FIG. 4A and FIG. 4B. As shown in the figure, the method includes the following steps.

S201. A first user uploads, through a service server, a DCP file corresponding to an AEI that the first user needs to register to a tenant bucket associated with the first user.

During implementation, the first user uploads, through a virtual machine that is in the service server and that is associated with the first user, the DCP file corresponding to the AEI that the first user needs to register to the storage bucket associated with the first user.

S202. The first user sends a first request to a management server through the service server, to request to register the AEI, where the first request carries an identifier of the first user, an identifier of an area in which the first user is located, authentication information of the first user, and a name and description information of the AEI that needs to be registered.

S203. The management server receives the first request.

S204. The management server attempts to authenticate the first user based on the authentication information of the first user.

S205. The management server obtains the DCP file from the tenant bucket associated with the first user.

If the management server determines that the DCP file does not exist in the tenant bucket associated with the first user, the management server may report an error, and prompt the user that the DCP file is not uploaded or an upload error occurs.

S206. The management server compiles the obtained DCP file into an AEI.

The management server may further generate an identifier (for example, a number or a name) of the AEI, and send the generated identifier of the AEI to the service server.

S207. The management server determines whether an identifier of a shadow tenant bucket associated with the identifier of the first user exists, and if yes, perform step S208, and otherwise, perform step S209.

S208. The management server encrypts and stores the AEI in the shadow tenant bucket associated with the identifier of the first user.

S209. The management server creates a shadow tenant bucket associated with the identifier of the first user.

S210. The management server encrypts and stores the AEI in the newly created shadow tenant bucket associated with the identifier of the first user.

According to the foregoing method, the management server may register the AEI based on the first request sent by the service server, and encrypt and store the AEI in the shadow tenant bucket associated with the identifier of the user. This improves security during storage of the AEI.

During implementation of the foregoing steps S208 and S210, the management server may further associate the identifier of the AEI with the shadow tenant bucket, for example, store a correspondence between an identifier of an AEI and an identifier (for example, a number or a name) of a shadow tenant bucket. A storage location of the AEI is queried based on the identifier of the AEI.

In a possible implementation, after completing the AEI registration process, the management server continues to perform an AEI loading process. Specifically, the management server receives a second request, where the request is used by a second user to request to load the AEI. The second request may carry an identifier of the second user, the identifier of the AEI, and information about an FPGA card. After receiving the second request, if the management server 102 determines, based on the identifier of the second request and the identifier of the AEI, that the permission verification of the second user succeeds, the management server 102 may load, based on the information about the FPGA card in the second request, the AEI associated with the identifier of the AEI to the FPGA card associated with a first virtual machine associated with the second user, to implement loading the AEI. During implementation, the second user may be the same as the first user. In this case, the second user may load, to the first virtual machine, the AEI that is previously registered through the steps shown in S101 to S104. Optionally, the second user may be different from the first user. In this case, access permission of the second user needs to be determined. When the second user meets a permission requirement, the AEI registered by the first user is loaded to the first virtual machine associated with the second user. The access permission of the second user means that the second user has permission to use the AEI registered by the first user, and the permission may be set through a network interface.

In specific implementation, a method for determining, by the management server, that the permission verification of the second user succeeds is as follows. The management server 102 may determine, according to a first correspondence, an identifier of an image corresponding to the identifier of the second user, where the first correspondence indicates a correspondence between an identifier of a second user and an identifier of an image allowed to be used by a virtual machine. The management server 102 may determine, according to a second correspondence, an identifier of at least one AEI corresponding to the identifier of the image, where the second correspondence is a correspondence between an identifier of an image and an identifier of an AEI. If the management server 102 determines that the identifier of the AEI carried in the second request is included in the identifier of the at least one AEI determined according to the second correspondence, the management server 102 may determine that the permission verification of the second user succeeds. The image related herein may be associated with one or more AEIs. An association relationship between the image and the one or more AEIs may be reflected as the foregoing second correspondence. The image may indicate one or a series of cloud services, and each AEI associated with the image may be specifically a specific algorithm related to the cloud service. After the user obtains authorization of the image, the management server 102 may associate the user with the image, for example, store the identifier of the user and the identifier of the image that is allowed to be used by the user after the user obtains the authorization as the first correspondence. It should be understood that the user may obtain the authorization of the image through image registration, purchase, or the like.

After receiving the second request, if determining that the permission verification of the second user succeeds, the management server 102 may query storage information of the AEI based on the identifier of the AEI. For example, the management server 102 may determine, according to a correspondence between an identifier of a shadow tenant bucket and an identifier of an AEI stored in a process of registering the AEI, the identifier of the shadow tenant bucket storing the AEI. In this way, the AEI can be obtained from the shadow tenant bucket.

The information about the FPGA card in the second request may be used to indicate slot information of the FPGA card, and the management server 102 may load, based on the slot information of the FPGA card, the AEI to the FPGA card associated with the slot information. For example, slot numbers of FPGA cards associated with the first virtual machine are 0, 1, 2, and 3. The information about the FPGA card may be the slot number "0", and is used to indicate to load the AEI to an FPGA card whose slot number is 0.

In a possible implementation manner, the management server 102 may load the AEI only to FPGA cards that are in an available status and that are in all FPGA cards associated with the first virtual machine. The available status is a working state of the FPGA card, and the management server 102 may set the working state of the FPGA card. For example, the management server 102 may set the working state of the FPGA card to a to-be-cleared status indicating that the FPGA card currently has to-be-cleared data and cannot be used to load a new AEI. The management server 102 may alternatively set the working state of the FPGA card to be the available status indicating that the FPGA card can be used to load a new AEI.

The second request may be sent by the service server running the first virtual machine. For example, if the second user is the same as the first user, the second request may be sent by the service server 101 shown in FIG. 1, where the service server 101 runs the virtual machine 103 associated with the first user. If the second user is different from the first user, the second request may be sent by the service server 101 shown in FIG. 1, where the service server 101 runs the virtual machine 103 associated with the second user.

For example, the following describes several manners of sending the second request.

Manner 1. The second user triggers the second request.

Specifically, the second request may be sent by the second user through the virtual machine. For example, the second user manually inputs, through the first virtual machine, an AEI loading command, and triggers, through the command, the service server running the first virtual machine to send the second request to the management server 102.

Manner 2. The first virtual machine sends the second request in a startup process.

The second request may be sent, by the service server that runs the first virtual machine and that is triggered by the first virtual machine in the startup process, to the management server 102. The first virtual machine may obtain, in the startup process, the authentication information of the second user, the identifier of the AEI, and the information about the FPGA card. Specifically, an example in which the second request is sent by the service server 101 (the service server 101 is associated with the second user) is used. The second user may input the identifier of the AEI and the information about the FPGA card in a process of requesting the management server 102 to register the virtual machine 103 (that is, the virtual machine associated with the second user). The management server 102 may obtain the authentication information of the second user in the process in which the second user requests to register the virtual machine 103. Then, the management server 102 may store the authentication information of the second user, the identifier of the AEI, and the information about the FPGA card. In the startup process of the virtual machine 103 after the virtual machine 103 is created, the service server 101 running the virtual machine 103 associated with the second user may obtain the previously stored authentication information of the second user, the identifier of the AEI, and the information about the FPGA card. The service server 101 generates the second request and sends the second request to the management server 102. In this way, the AEI can be automatically loaded in the startup process of the virtual machine 103. The foregoing startup process of the virtual machine 103 may be a first startup process after the virtual machine 103 is created.

Figure 5:
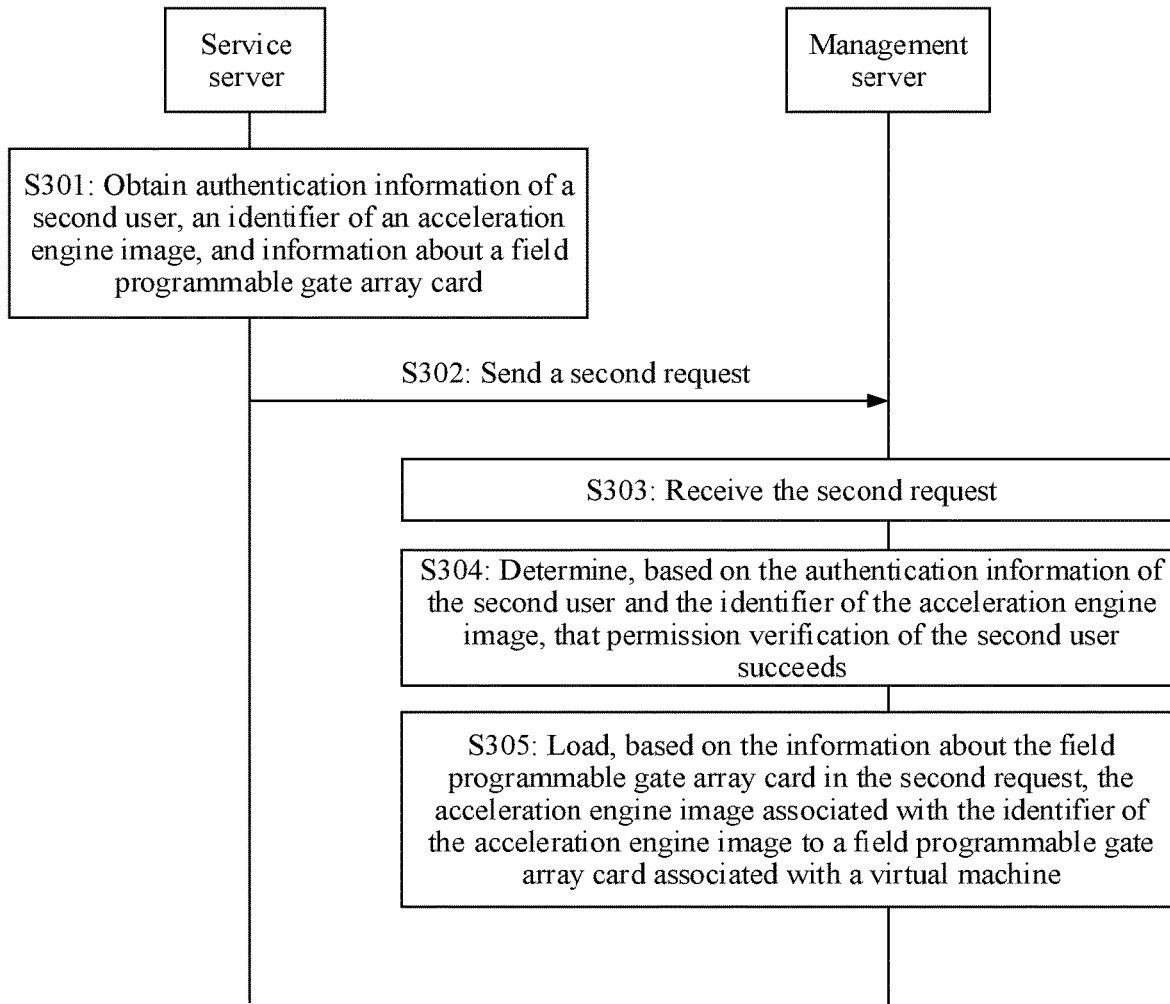
FIG. 5 is a schematic flowchart of another data management method according to an embodiment of this application.

It is assumed that the second request is sent by the service server 101 that is triggered by the virtual machine 103 associated with the second user in the startup process shown in FIG. 1. The following describes a method for loading the AEI shown in the manner 2 with reference to a flowchart of a method for loading an AEI by a virtual machine shown in FIG. 5.

S301. A service server obtains authentication information of a second user, an identifier of an AEI, and information about an FPGA card in a startup process of a virtual machine, where the second user is associated with the virtual machine.

S302. The service server sends a second request to a management server in the startup process of the virtual machine, where the second request is used by the second user to request to load the AEI, and the second request includes the authentication information of the second user, the identifier of the AEI, and the information about the FPGA card.

S303. The management server receives the second request.

S304. The management server determines, based on the authentication information in the second request and the identifier of the AEI, that the permission verification of the second user succeeds, and during implementation, the management server may further determine, based on the authentication information in the second request, that the second user is authenticated.

S305. The management server loads, based on the information about the FPGA card in the second request, the AEI associated with the identifier of the AEI to an FPGA card associated with the virtual machine. During implementation, if an AEI loading failure occurs during execution of the step S305, the management server may further prompt the user through the service server, for example, prompt the user to manually input an AEI loading command, so that the service server may further send the second request in the foregoing manner 1.

According to the method shown in the foregoing steps S301 to S305, an AEI loading process may be automatically initiated in the startup process of the virtual machine, so that the user does not need to manually input the AEI loading command after the virtual machine is started. This makes the AEI loading process simpler and faster, and reduces error risks when the user manually inputs the AEI loading command.

For example, based on the logical architecture shown in FIG. 2, during implementation of the steps shown in S301 to S305, in a process in which the user requests, through a web page 201, to register the virtual machine 103, the user may input the identifier of the AEI that the user needs to load and the information about the FPGA card. The web page 201 may also obtain the authentication information of the user in the process of registering the virtual machine. Then, the web page 201 may send, to a cloud management service 202 at an IaaS layer, the authentication information of the user, the identifier of the AEI that the user needs to load, and the information about the FPGA card, and the cloud management service 202 stores the foregoing information in a database (metadata) 207 at the IaaS layer. In a first startup process after the virtual machine 103 is created, the virtual machine 103 may obtain, from the database 207 through a startup script, the identifier of the AEI that the user needs to load and the information about the FPGA card, to perform the foregoing step S301, and trigger the foregoing step S302 accordingly. In this way, the AEI is loaded through the foregoing steps S301 to S305. Alternatively, in a case in which the identifier of the AEI that the user needs to load and the information about the FPGA card fail to be obtained through the startup script, the virtual machine 103 may report an error to the user, for example, prompt the user to manually input the identifier of the AEI that the user needs to load and the information about the FPGA card.

In another possible embodiment, when the virtual machine associated with the user is deleted, a shadow tenant bucket associated with the user also needs to be deleted. Specifically, the management server may further receive a third request, where the third request is used by a third user to request to delete a second virtual machine associated with the third user. Then, the management server 102 may release, in response to the third request, a resource occupied by the second virtual machine, and asynchronously clear an AEI in an FPGA card associated with the second virtual machine. The third user herein may be the same as the first user, or may be the same as the second user, or may be different from both the first user and the second user shown in FIG. 1. If the third user is the same as the first user, the third request may be sent to the management server 102 by the service server 101 that is shown in FIG. 1 and that is triggered by the virtual machine 103 associated with the first user, and is used to request to delete the virtual machine 103 associated with the first user. If the third user is the same as the second user, the third request may be sent to the management server 102 by the service server 101 that is shown in FIG. 1 and that is triggered by the virtual machine 103 associated with the second user, and is used to request to delete the virtual machine 103 associated with the second user.

In the foregoing manner, the management server 102 no longer needs to wait until clearing of the AEI loaded to the FPGA card is completed before releasing the resource occupied by the second virtual machine, to avoid a release failure that is of the resource occupied by the second virtual machine and that is caused by a fault in the process of loading the AEI to the FPGA card. This avoids a user data leakage risk caused by a clearing failure of the resource occupied by the second virtual machine, and improves security of an FPGA cloud service.

Specifically, when clearing AEIs in FPGA cards associated with the second virtual machine, the management server 102 may set each FPGA card to a to-be-cleared status, and perform polling for each preset duration (for example, 10 seconds or 60 seconds) to determine whether the AEI loaded in each FPGA card is cleared. If it is determined that the FPGA card is successfully cleared, the management server 102 sets the FPGA card to an available status, and otherwise, it is determined that the FPGA card fails to be cleared, and the management server 102 confirms again, after the preset duration, whether the AEI loaded in the FPGA card is cleared. The management server 102 may generate an alarm after determining that a quantity of times that the FPGA card fails to be cleared reaches a threshold (the threshold may be set to a constant, for example, 1 or 3). For example, the management server 102 notifies the second virtual machine to prompt the third user that the FPGA card fails to be cleared, and then, the third user may clear the AEI in the FPGA card in another manner.

In the foregoing process, the FPGA card is no longer in the available status before the AEI is cleared, to avoid loading a new AEI according to a request of another user before the AEI in the FPGA card is cleared, and avoid leakage of the AEI that is not cleared. This improves the security of the FPGA cloud service.

Figure 6:
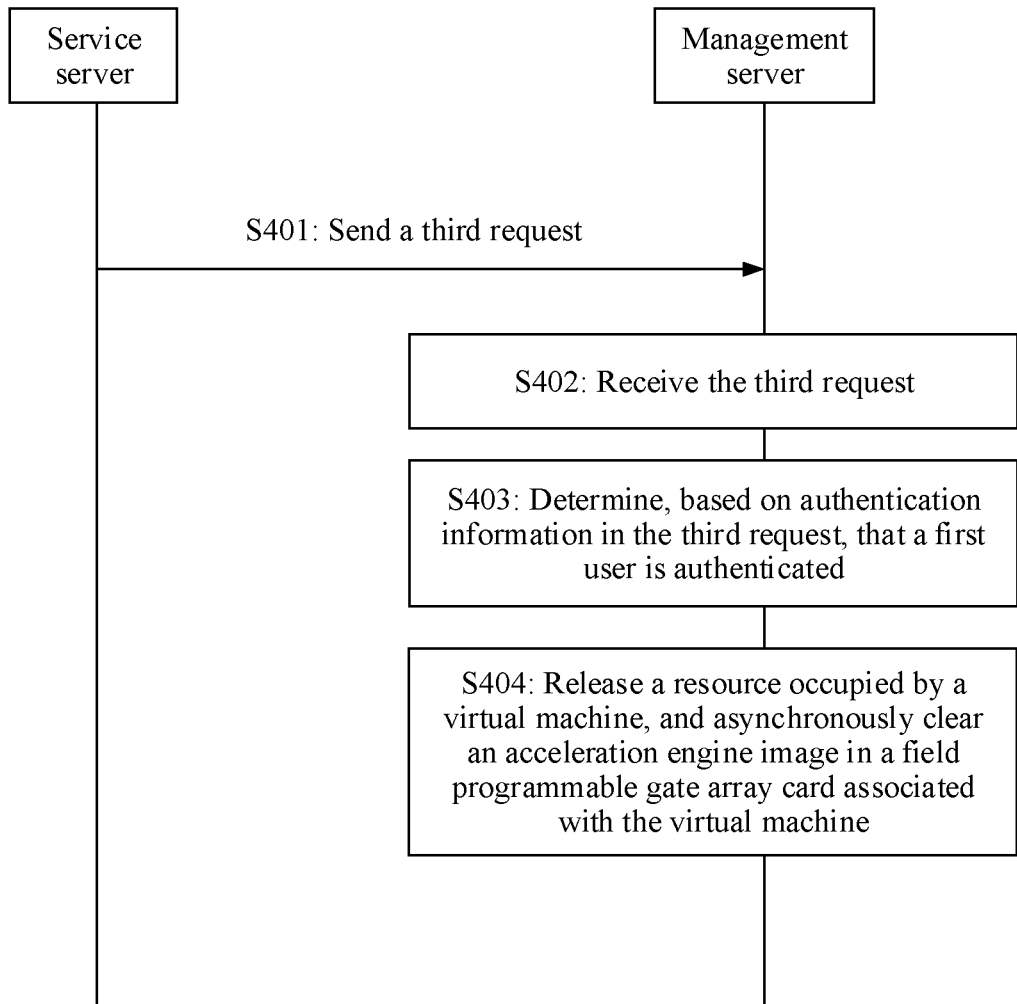
FIG. 6 is a schematic flowchart of another data management method according to an embodiment of this application.

Next, an example in which the third user is the first user in the FPGA cloud computing system 100 shown in FIG. 1 is used to describe a process in which the first user requests to delete the virtual machine 103 with reference to a flowchart shown in FIG. 6.

S401. A service server sends a third request to a management server, where the third request is used by a first user to request to delete a virtual machine associated with the first user, and the third request includes authentication information of the first user.

S402. The management server receives the third request.

S403. The management server determines, based on the authentication information in the third request, that the first user is authenticated.

S404. The management server releases a resource occupied by the virtual machine, and asynchronously clears an AEI in an FPGA card associated with the virtual machine.

According to the method shown in the foregoing steps S401 to S404, a clearing result of the AEI in the FPGA card does not affect the release of the resource occupied by the virtual machine 103. Therefore, even if the AEI in the FPGA card fails to be cleared, the resource occupied by the virtual machine 103 can still be normally released. This avoids user data leakage caused by abnormal release of the virtual machine resource.

Figure 7:
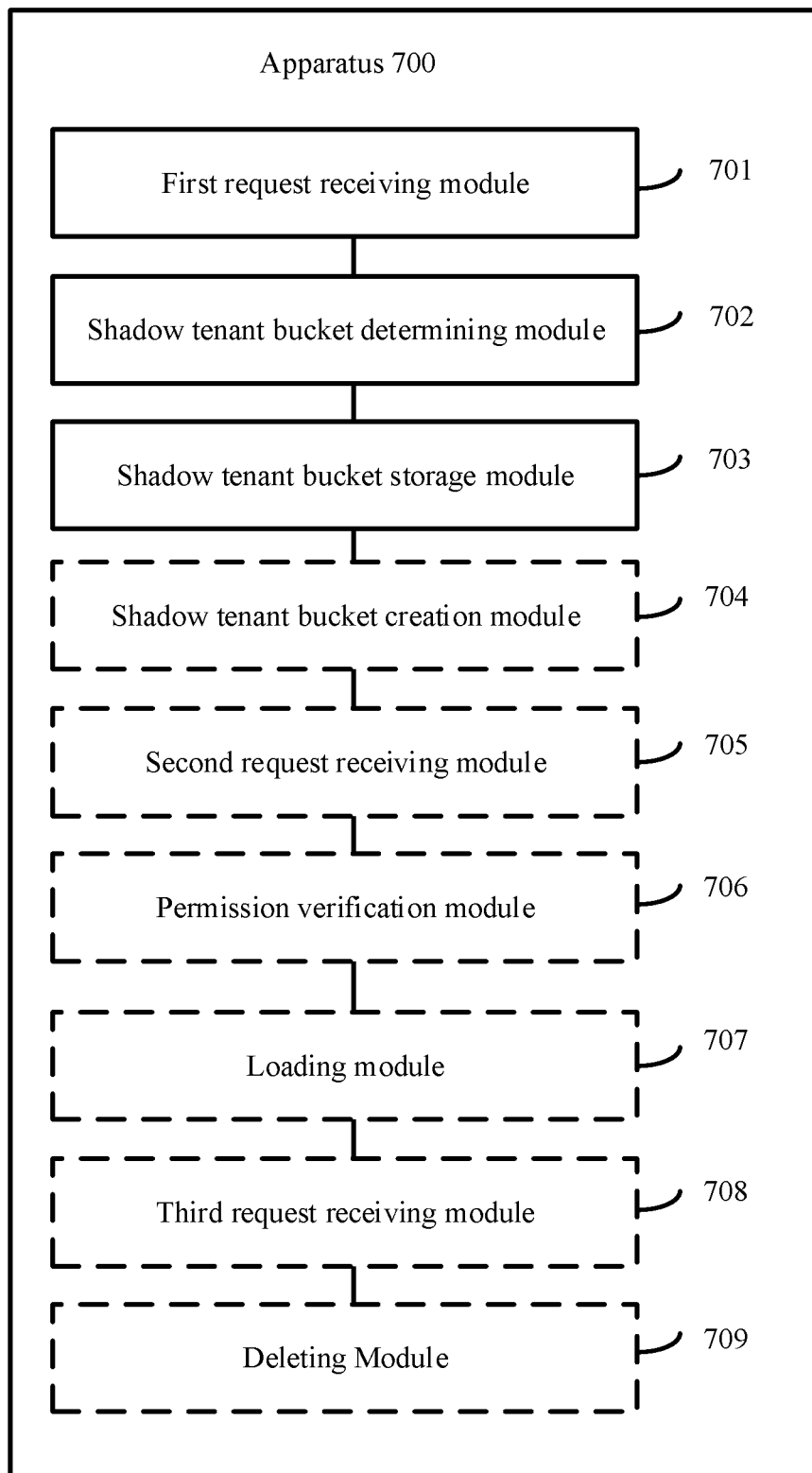
FIG. 7 is a schematic structural diagram of a data management apparatus according to an embodiment of this application.
Figure 8:
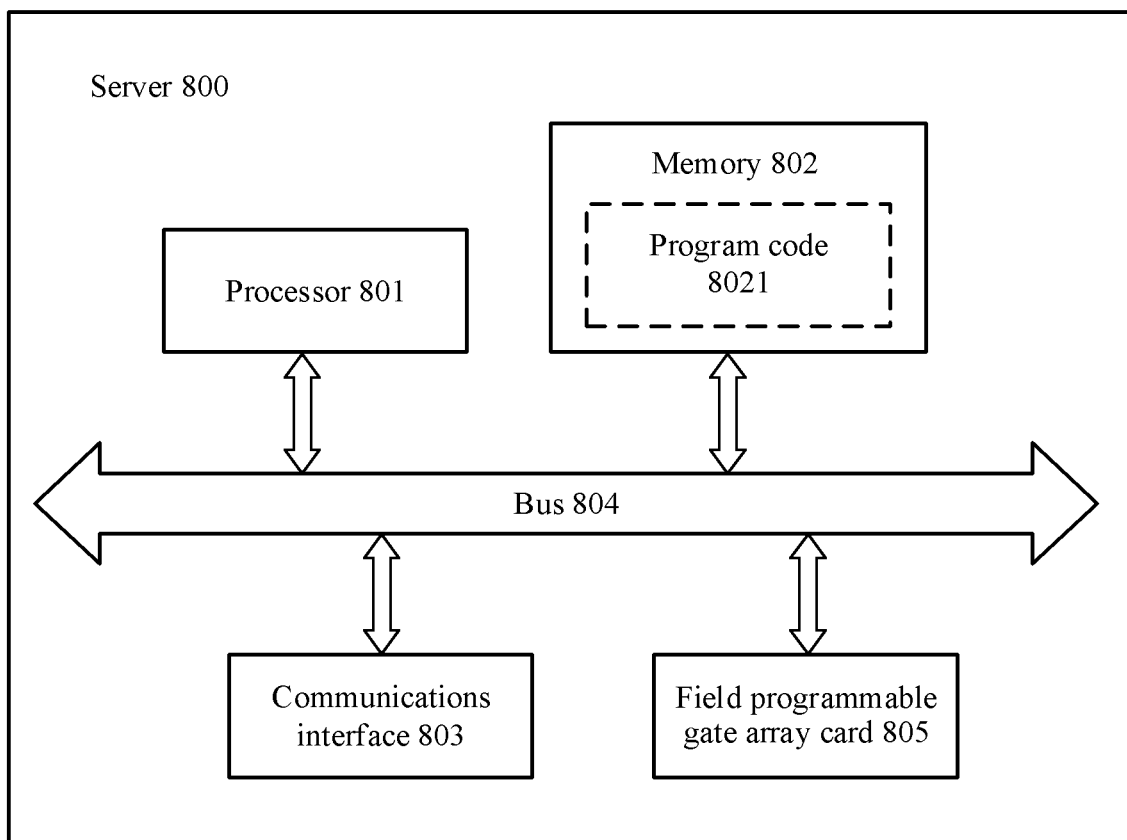
FIG. 8 is a schematic structural diagram of another data management apparatus according to an embodiment of this application.

With reference to FIG. 1 to FIG. 6, the data management method provided in the embodiments of this application is described in detail. With reference to FIG. 7 to FIG. 8, the following describes a server and a data management apparatus according to embodiments of this application.

FIG. 7 is a schematic structural diagram of a data management apparatus 700 according to an embodiment of this application. The data management apparatus 700 may be applicable to the system shown in FIG. 1, and is configured to perform functions of the management server in the foregoing method embodiments. The data management apparatus 700 includes a first request receiving module 701, a shadow tenant bucket determining module 702, a shadow tenant bucket storage module 703, a shadow tenant bucket creation module 704, a second request receiving module 705, a permission verification module 706, a loading module 707, a third request receiving module 708, and a deleting module 709.

The first request receiving module 701 is configured to receive a first request. The first request is used by a first user to request to register an AEI customized by the first user, and the first request includes an identifier of the first user and an identifier of the AEI.

The shadow tenant bucket determining module 702 is configured to determine, based on the identifier of the first user, whether a shadow tenant bucket associated with the identifier of the first user exists. The shadow tenant bucket is used to store the AEI of the first user, and each shadow tenant bucket is in a one-to-one correspondence with a user.

The shadow tenant bucket storage module 703 is configured to, when the shadow tenant bucket associated with the identifier of the first user exists, store the AEI in the shadow tenant bucket associated with the identifier of the first user.

Optionally, when determining, based on the identifier of the first user, whether the shadow tenant bucket associated with the identifier of the first user exists, the shadow tenant bucket determining module 702 is specifically configured to determine, according to a first rule, an identifier of the shadow tenant bucket associated with the identifier of the first user, where the first rule is used to indicate a generation rule for generating the identifier of the shadow tenant bucket, determining whether a shadow tenant bucket having the identifier exists, and when the shadow tenant bucket having the identifier exists, determine that the shadow tenant bucket having the identifier is the shadow tenant bucket associated with the identifier of the first user.

Optionally, the shadow tenant bucket creation module 704 is configured to, when the shadow tenant bucket associated with the identifier of the first user does not exist, select storage space with a preset size, use the storage space as the shadow tenant bucket associated with the identifier of the first user, and store the AEI in the shadow tenant bucket associated with the identifier of the first user.

Optionally, the second request receiving module 705 is configured to receive a second request. The second request is used by a second user to request to load the AEI, and the second request includes an identifier of the second user, the identifier of the AEI, and information about a FPGA card.

The permission verification module 706 is configured to perform permission verification on the second user based on the identifier of the second user and the identifier of the AEI.

The loading module 707 is configured to, when the permission verification performed on the second user succeeds, load, based on the information about the FPGA card, the AEI to an FPGA card associated with a first virtual machine, where the first virtual machine is a virtual machine associated with the second user.

Optionally, if the identifier of the second user includes an identifier of the first virtual machine, when performing the permission verification on the second user based on the identifier of the second user and the identifier of the AEI, the permission verification module 706 is specifically configured to determine, according to a first correspondence, an identifier of an image corresponding to the identifier of the first virtual machine, where the first correspondence indicates a correspondence between an identifier of a virtual machine and an identifier of an image allowed to be used by the virtual machine, determine, according to a second correspondence, an identifier of at least one AEI corresponding to the identifier of the image, where the second correspondence is a correspondence between an identifier of an image and an identifier of an AEI, and determine that the identifier of the at least one AEI includes the identifier of the AEI.

The third request receiving module 708 is configured to receive a third request. The third request is used by a third user to request to delete a second virtual machine, where the second virtual machine is a virtual machine associated with the third user.

The deleting module 709 is configured to release a resource occupied by the second virtual machine, and clear an AEI in an FPGA card associated with the second virtual machine.

Optionally, when releasing the resource occupied by the second virtual machine and clearing the AEI in the FPGA card associated with the second virtual machine, the deleting module 709 is specifically configured to set a state of the FPGA card to a to-be-cleared status, and invoke an AEI clearing interface of the FPGA card associated with the second virtual machine, to clear the AEI loaded to the FPGA card associated with the second virtual machine, when preset duration is met, determine whether an AEI in each FPGA card in FPGA cards associated with the second virtual machine is successfully cleared, and if yes, set the FPGA card to an available status, and otherwise, determine that the FPGA card is not successfully cleared, and after determining that a quantity of times that the FPGA card is not successfully cleared reaches a threshold, generate an alarm.

It should be understood that FIG. 7 shows only one module division manner of the data management apparatus 700. That the data management apparatus 700 has another module division manner is not limited in this application. For example, the data management apparatus 700 may be modularized into an FPGA image service module, a tenant authentication service module, and an AEI management service module. The FPGA image service module may have functions of the first request receiving module 701, the shadow tenant bucket determining module 702, and the shadow tenant bucket storage module 703. The tenant authentication service module may be configured to cooperate with an FPGA image service to attempt to authenticate a user. The AEI management service may be configured to cooperate with the FPGA image service, to compile an AEI. Optionally, the FPGA image service module may further have functions of the shadow tenant bucket creation module 704, the second request receiving module 705, the permission verification module 706, the loading module 707, the third request receiving module 708, and the deleting module 709.

It should be understood that the apparatus 700 in this embodiment of this application may be implemented through an application-specific integrated circuit (ASIC), or may be implemented through a programmable logic device (PLD). The PLD may be a complex programmable logic device (CPLD), an FPGA, generic array logic (GAL), or any combination thereof. When the data processing methods shown in FIG. 3 to FIG. 6 are implemented through software, the apparatus 700 and modules of the apparatus 700 may also be software modules.

It should be understood that the apparatus 700 may be corresponding to only the management server 102 related in the embodiments of this application. To be specific, the apparatus 700 is configured to perform only corresponding steps of the management server 102 shown in FIG. 3 to FIG. 6. A apparatus 700 may be further corresponding to the service server 101 related in the embodiments of this application. To be specific, the apparatus 700 may be further configured to perform corresponding steps of the service server 101 provided in the embodiments of this application. In this case, the apparatus 700 may be connected to an FPGA card.

The apparatus 700 in this embodiment of this application may correspondingly perform the methods described in the embodiments of this application. In addition, the foregoing and other operations and/or functions of the units in the apparatus 700 are separately used to implement corresponding procedures of the methods in FIG. 3 to FIG. 6. For brevity, details are not described herein again.

FIG. 8 is a schematic structural diagram of a server 800 according to an embodiment of this application. As shown in the figure, the server 800 includes a processor 801, a memory 802, a communications interface 803, a bus 804, and an FPGA card 805. The processor 801, the memory 802, the communications interface 803, and the FPGA card 805 communicate with each other through the bus 804, or may communicate with each other in another manner such as wireless transmission. The memory 802 is configured to store program code 8021. The processor 801 may invoke the program code 8021 stored in the memory 802, to perform the following operations determining, based on an identifier of a first user in a first request received by the communications interface 803, whether a shadow tenant bucket associated with the identifier of the first user exists, where the shadow tenant bucket is used to store an AEI of the first user, and each shadow tenant bucket is in a one-to-one correspondence with a user, and when the shadow tenant bucket associated with the identifier of the first user exists, storing the AEI in the shadow tenant bucket associated with the identifier of the first user.

Optionally, the processor 801 may further perform the following operations determining, according to a first rule, an identifier of the shadow tenant bucket associated with the identifier of the first user, where the first rule is used to indicate a generation rule for generating the identifier of the shadow tenant bucket, determining whether a shadow tenant bucket having the identifier exists, and when the shadow tenant bucket having the identifier exists, determining that the shadow tenant bucket having the identifier is the shadow tenant bucket associated with the identifier of the first user.

Optionally, the processor 801 may further perform the following operations, when the shadow tenant bucket associated with the identifier of the first user does not exist, selecting storage space with a preset size, using the storage space as the shadow tenant bucket associated with the identifier of the first user, and storing the AEI in the shadow tenant bucket associated with the identifier of the first user.

Optionally, the processor 801 may further perform the following operations performing permission verification on a second user based on an identifier of the second user and an identifier of the AEI in a second request received by the communications interface 803, and when the permission verification performed on the second user succeeds, loading, based on information about the FPGA card, the AEI to an FPGA card associated with a first virtual machine, where the first virtual machine is a virtual machine associated with the second user.

Optionally, the identifier of the second user includes an identifier of the first virtual machine, and the processor 801 may further perform the following operations determining, according to a first correspondence, an identifier of an image corresponding to the identifier of the first virtual machine, where the first correspondence indicates a correspondence between an identifier of a virtual machine and an identifier of an image allowed to be used by the virtual machine, determining, according to a second correspondence, an identifier of at least one AEI corresponding to the identifier of the image, where the second correspondence is a correspondence between an identifier of an image and an identifier of an AEI, and determining that the identifier of the at least one AEI includes the identifier of the AEI.

Optionally, the processor 801 may further perform the following operation, in response to a third request received by the communications interface 803, releasing a resource occupied by a second virtual machine, and clearing an AEI in an FPGA card associated with the second virtual machine.

Optionally, the processor 801 may further perform the following operation setting a state of the FPGA card to a to-be-cleared status, and invoking an AEI clearing interface of the FPGA card associated with the second virtual machine, to clear the AEI file loaded to the FPGA card associated with the second virtual machine, when preset duration is met, determining whether an AEI file in each FPGA card in FPGA cards associated with the second virtual machine is successfully cleared, if yes, setting the FPGA card to an available status, and otherwise, determining that the FPGA card is not successfully cleared, and after determining that a quantity of times that the FPGA card is not successfully cleared reaches a threshold, generating an alarm.

It should be understood that in this embodiment of this application, the processor 801 may be a central processing unit (CPU), or the processor 801 may be another general purpose processor, a digital signal processor (DSP), an ASIC, an FPGA, or another PLD, discrete gate or transistor logic device, discrete hardware component, or the like. The general purpose processor may be a microprocessor or any conventional processor or the like.

The memory 802 may include a read-only memory (ROM) and a random-access memory (RAM), and provide an instruction and data to the processor 801. The memory 802 may further include a non-volatile RAM. For example, the memory 802 may further store information of a device type.

The memory 202 may be a volatile memory or a non-volatile memory, or may include both a volatile memory and a non-volatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM, used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

In addition to a data bus, The bus 804 may further include a power bus, a control bus, a status signal bus, and the like. However, for clear description, various types of buses in the figure are marked as the bus 804.

It should be understood that the server 800 according to this embodiment of this application may be corresponding to the management server 102 provided in the embodiments of this application. The server 800 may be configured to implement corresponding steps performed by the management server 102 in the methods shown in FIG. 3 to FIG. 6. For brevity, details are not described herein again.

It should be understood that the server 800 according to this embodiment of this application may be corresponding to the data management apparatus 700 in the embodiment of this application, and may be corresponding to an execution body for performing the method shown in FIG. 3 in the embodiment of this application, in addition, the foregoing and other operations and/or functions of the components in the server 800 are separately used to implement corresponding procedures of the methods in FIG. 3 to FIG. 6.

For example, the communications interface 803 may be configured to perform a function of the first request receiving module 701 in the data management apparatus 700. The processor 801 may be configured to execute the program code stored in the memory 802, to implement a function of the shadow tenant bucket determining module 702.

Optionally, the communications interface 803 may be further configured to perform functions of the second request receiving module 705 and the third request receiving module 708, and the processor 801 may be further configured to perform functions of the shadow tenant bucket creation module 704, the permission verification module 706, the loading module 707, and the deleting module 709.

Optionally, the server 800 may further include an FPGA card 805. In this case, the server 800 may further have a function of the service server 101 in the embodiments of this application.

It should be understood that, if the server 800 is corresponding to the management server 102 related in the embodiments of this application, the server 800 is configured to perform corresponding steps of the management server 102 shown in FIG. 3 to FIG. 6. Optionally, the server 800 further includes the FPGA card 805. If the server 800 is corresponding to the service server 101 related in the embodiments of this application. To be specific, the server 800 is further configured to perform corresponding steps of the service server 101 provided in the embodiments of this application. In this case, the server 800 includes the FPGA card 805.

All or some of the foregoing embodiments may be implemented through software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may implement the described functions for each specific application through different methods.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

What is claimed is:

1. A data management method, implemented by a management server, wherein the method comprises:
   receiving, from a first user, a first request to register a first acceleration engine image (AEI), wherein the first request comprises a first identifier of the first user and a second identifier of the first AEI;
   determining, based on the first identifier, whether a first shadow tenant bucket corresponding to the first identifier exists, wherein each of a plurality of shadow tenant buckets are in a one-to-one correspondence with one of a plurality of users; and
   storing, the first AEI in the first shadow tenant bucket when the first shadow tenant bucket exists.

2. The method of claim 1, wherein determining whether the first shadow tenant bucket exists comprises:
   determining, based on a first rule, a third identifier of the first shadow tenant bucket, wherein the first rule indicates a generation rule of the third identifier;
   determining whether a second shadow tenant bucket exists, wherein the second shadow tenant bucket comprises the third identifier; and
   determining, when the second shadow tenant bucket exists, that the second shadow tenant bucket is the first shadow tenant bucket.

3. The method of claim 1, wherein when the first shadow tenant bucket does not exist, the method further comprises:
   selecting storage space with a preset size;
   using the storage space as the first shadow tenant bucket; and
   storing the first AEI in the first shadow tenant bucket.

4. The method of claim 1, wherein after storing the first AEI in the first shadow tenant bucket, the method further comprises:
   receiving, from a second user, a second request to load the first AEI, wherein the second request comprises a fourth identifier of the second user, the second identifier, and information about a first field programmable gate array (FPGA) card;
performing permission verification on the second user based on the fourth identifier and the second identifier; and
loading, based on the information, the first AEI to a second FPGA card corresponding to a first virtual machine when the permission verification succeeds, wherein the first virtual machine corresponds to the second user.

5. The method of claim 4, wherein the fourth identifier comprises a fifth identifier of the first virtual machine, wherein performing the permission verification on the second user comprises:
determining, based on a first correspondence, a sixth identifier of an image corresponding to the fifth identifier, wherein the first correspondence is between a seventh identifier of a virtual machine and an eighth identifier of an image for the virtual machine;
determining, based on a second correspondence, a ninth identifier of at least one AEI corresponding to the sixth identifier, wherein the second correspondence is between a tenth identifier of an image and an eleventh identifier of a second AEI; and
determining that the ninth identifier comprises the eleventh identifier of the AEI.

6. The method of claim 1, further comprising:
receiving a third request to delete a second virtual machine, wherein the second virtual machine corresponds to a third user;
releasing a resource of the second virtual machine; and
clearing a second AEI in a first FPGA card corresponding to the second virtual machine.

7. The method of claim 6, wherein clearing the second AEI comprises:
setting a state of the first FPGA card to a to-be-cleared status;
invoking an AEI clearing interface of the first FPGA card to clear a first AEI file on the first FPGA card;
determining, when a preset duration is met, whether a second AEI file in each FPGA card in a plurality of FPGA cards corresponding to the second virtual machine is successfully cleared;
setting the first FPGA card to an available status when the first AEI file is successfully cleared; and
when the first AEI file is not successfully cleared, determining that the first FPGA card is not successfully cleared and generating an alarm when a quantity of times that the first FPGA card is not successfully cleared reaches a threshold.

8. A data management apparatus, comprising:
a processor; and
a memory coupled to the processor and configured to store instructions that, when executed by the processor, cause the data management apparatus to be configured to:
receive, from a first user, a first request to register a first acceleration engine image (AEI), wherein the first request comprises a first identifier of the first user and a second identifier of the first AEI;
determine, based on the first identifier, whether a first shadow tenant bucket corresponding to the first identifier exists, wherein each of a plurality of shadow tenant buckets are in a one-to-one correspondence with one of a plurality of users; and
store the first AEI in the first shadow tenant bucket when the first shadow tenant bucket exists.

9. The data management apparatus of claim 8, wherein the instructions further cause the data management apparatus to be configured to:
determine, based on a first rule, a third identifier of the first shadow tenant bucket, wherein the first rule indicates a generation rule of the third identifier;
determine whether a second shadow tenant bucket exists, wherein the second shadow tenant bucket comprises the third identifier; and
determine, when the second shadow tenant bucket exists, that the second shadow tenant bucket is the first shadow tenant bucket.

10. The data management apparatus of claim 8, wherein when the first shadow tenant bucket does not exist, the instructions further cause the data management apparatus to be configured to:
select storage space with a preset size;
use the storage space as the first shadow tenant bucket; and
store the first AEI in the first shadow tenant bucket.

11. The data management apparatus of claim 8, wherein the instructions further cause the data management apparatus to be configured to:
receive, from a second user, a second request to load the first AEI, wherein the second request comprises a fourth identifier of the second user, the second identifier, and information about a first field programmable gate array (FPGA) card;
perform permission verification on the second user based on the fourth identifier and the second identifier; and
load, based on the information, the first AEI to a second FPGA card corresponding to a first virtual machine when the permission verification performed on the second user succeeds, wherein the first virtual machine corresponds to the second user.

12. The data management apparatus of claim 11, wherein the fourth identifier comprises a fifth identifier of the first virtual machine, wherein the instructions further cause the data management apparatus to be configured to:
determine, based on a first correspondence, a sixth identifier of an image corresponding to the fifth identifier, wherein the first correspondence is between a seventh identifier of a virtual machine and an eighth identifier of an image used by the virtual machine;
determine, based on a second correspondence, a ninth identifier of at least one AEI corresponding to the sixth identifier, wherein the second correspondence is a correspondence between a tenth identifier of an image and an eleventh identifier of a second AEI; and
determine that the ninth identifier comprises the eleventh identifier of the AEI.

13. The data management apparatus of claim 8, wherein the instructions further cause the data management apparatus to be configured to:
receive a third request to delete a second virtual machine, wherein the second virtual machine corresponds to a third user;
release a resource of the second virtual machine; and
clear a second AEI in a first FPGA card corresponding to the second virtual machine.

14. The data management apparatus of claim 13, wherein the instructions further cause the data management apparatus to be configured to:
set a state of the first FPGA card to a to-be-cleared status;

invoke an AEI clearing interface of the first FPGA card to clear a first AEI file on the first FPGA card;

determine, when preset duration is met, whether a second AEI file in each FPGA card in a plurality of FPGA cards corresponding to the second virtual machine is successfully cleared;

set the first FPGA card to an available status when the first AEI file is successfully cleared; and when the first AEI file is not successfully cleared, determine that the first FPGA card is not successfully cleared and generate an alarm when a quantity of times that the first FPGA card is not successfully cleared reaches a threshold.

15. A computer program product comprising computer-executable instructions stored on a non-transitory computer-readable medium that, when executed by a processor, cause a data management apparatus to:

receive, from a first user, a first request to register a first acceleration engine image (AEI), wherein the first request comprises a first identifier of the first user and a second identifier of the first AEI;

determine, based on the first identifier, whether a first shadow tenant bucket corresponding to the first identifier exists, wherein each of a plurality of shadow tenant buckets are in a one-to-one correspondence with a plurality of users; and store the AEI in the first shadow tenant bucket when the first shadow tenant bucket exists.

16. The computer program product of claim 15, wherein the instructions further cause the data management apparatus to:

determine, based on a first rule, a third identifier of the first shadow tenant bucket, wherein the first rule indicates a generation rule of the third identifier;

determine whether a second shadow tenant bucket exists, wherein the second shadow tenant bucket comprises the third identifier; and determine, when the second shadow tenant bucket exists, that the second shadow tenant bucket is the first shadow tenant bucket.

17. The computer program product of claim 15, wherein the instructions further cause the data management apparatus to:

select storage space with a preset size;

use the storage space as the first shadow tenant bucket; and store the first AEI in the first shadow tenant bucket.

18. The computer program product of claim 15, wherein the instructions further cause the data management apparatus to:

receive, from a second user, a second request to load the first AEI, wherein the second request comprises a fourth identifier of the second user, the second identifier, and information about a first field programmable gate array (FPGA) card;

perform permission verification on the second user based on the fourth identifier and the second identifier; and load, based on the information, the first AEI to a second FPGA card corresponding to a first virtual machine when the permission verification succeeds, wherein the first virtual machine corresponds to the second user.

19. The computer program product of claim 18, wherein the fourth identifier comprises a fifth identifier of the first virtual machine, and wherein the instructions further cause the data management apparatus to:

determine, based on a first correspondence, a sixth identifier of an image corresponding to the fifth identifier, wherein the first correspondence is between a seventh identifier of a virtual machine and an eighth identifier of an image for the virtual machine;

determining, based on a second correspondence, a ninth identifier of at least one AEI corresponding to the sixth identifier, wherein the second correspondence is between a tenth identifier of an image and an eleventh identifier of a second AEI; and determining that the ninth identifier comprises the eleventh identifier of the AEI.

20. The computer program product of claim 18, wherein the instructions further cause the data management apparatus to:

receive a third request to delete a second virtual machine, wherein the second virtual machine corresponds to a third user;

release a resource of the second virtual machine; and clear a second AEI in a first FPGA card corresponding to the second virtual machine.

* * * * *